United States Patent [19]

Hill et al.

[11] Patent Number: 4,751,205
[45] Date of Patent: * Jun. 14, 1988

[54] THERMALLY BONDED FIBROUS PRODUCT

[75] Inventors: Charles A. Hill, Lynchburg, Va.; James P. Price, Jr., Harlem, Ga.

[73] Assignee: The Babcock & Wilcox Company, New Orleans, La.

[*] Notice: The portion of the term of this patent subsequent to Mar. 17, 2004 has been disclaimed.

[21] Appl. No.: 14,942

[22] Filed: Feb. 17, 1987

Related U.S. Application Data

[63] Continuation-in-part of Ser. No. 857,699, Apr. 29, 1986, Pat. No. 4,650,775.

[51] Int. Cl.[4] .............................................. C04B 35/02
[52] U.S. Cl. ......................................... 501/95; 501/96; 428/288; 428/296; 162/152; 162/181.2; 162/181.6; 264/DIG. 19
[58] Field of Search ................... 501/36, 53, 73, 77, 501/95, 96; 428/288, 296; 264/DIG. 19; 162/152, 181.6, 181.2

[56] References Cited

U.S. PATENT DOCUMENTS

| 4,269,887 | 5/1981 | Sonobe et al. | 428/288 |
| 4,331,773 | 5/1982 | Hongs et al. | 501/95 |
| 4,381,716 | 5/1983 | Hastings et al. | 501/95 |
| 4,384,046 | 5/1983 | Nakagami | 501/95 |
| 4,650,775 | 3/1987 | Hill | 501/95 |

FOREIGN PATENT DOCUMENTS 1111956 5/1986 Japan ...................................... 501/95

Primary Examiner—William R. Dixon, Jr.
Assistant Examiner—Anthony Green
Attorney, Agent, or Firm—Vytas R. Matas; Robert J. Edwards

[57] ABSTRACT

A thermally bonded fibrous product is composed of a sintered blend of ceramic fibers, low-grade silica material and boron nitride.

11 Claims, 8 Drawing Sheets

THERMALLY BONDED FIBROUS PRODUCT

This is a continuation-in-part of Ser. No. 857,699 filed 4-29-B 86, now U.S. Pat. No. 4,650,775.

BACKGROUND OF THE INVENTION

1. Field of the Invention

This invention relates to thermally bonded products and, more particularly, to thermally bonded fibrous products of a novel and advantageous composition suited for use as diesel soot filters, kiln furniture, combustor liners, burner tubes and other rigid high temperature insulation applications.

2. Description of the Prior Art

Ceramic fibers are often used to provide thermal insulation from very high temperatures. For many applications, it is convenient and often necessary to form the fibers into rigid shapes such as boards or specialty configurations. Two approaches are used to accomplish bonding of ceramic fibers to obtain these shapes. The first approach, chemical bonding, is the most common. A heat or air setting binder, usually in the liquid form, is added to the fiber and through drying, the application of low to moderate heat, or chemical reaction, the binder becomes rigid and literally glues the fibers into a rigid structure. Such binders include colloidal oxide suspensions, silicate solutions and thermoplastic suspensions. The strength of these systems are relatively low, typically having 20 to 50 psi flexural strength properties. More binder can be added to increase the strength. However, the additional binder adversely affects thermal insulating properties.

The chemical bonding method of producing a fibrous product is primarily used for low cost applications when no post drying heat treatment is conducted as part of the binding process. The result of this composition is a product which loses much of its strength and integrity after subsequent heat treatment. This limits the product's usefulness in applications in which handleability or load bearing capacity are important once the product has been subjected to temperatures over 1800° F.

A second approach has been developed which utilizes rigid ceramic fiber shapes made of very expensive raw materials and is subjected to a sintering treatment after forming and drying. These materials are lightweight insulation materials targeted for use on reusable space shuttle vehicles. The success of these materials, as taught in U.S. Pat. No. 4,148,962, depends on the use of very pure raw materials as well as highly controlled processing, such that foreign contaminants are excluded from the finished fiber product.

The strengths of these types of products are normally 10 to 20 times that of fibrous products of the type produced by the chemical bonding approach. These products also retain their properties after heating above the 1800° F. range. A major property desired as part of these products is the resistance to devitrification during subsequent heat treating. This cristobalite is subject to disruptive phase changes and would therefore, be unsuitable for the intended use, space shuttle tiles. It has been found that by using high purity materials, the devitrification of the glassy components can be minimized and kept within the acceptable range.

The requirements for successful application of this second approach to the production of fibrous insulating products teach against the use of lower grades of fibers and/or lower grade particulates. Such an approach would be suitable for use in applications which are identified as requiring the present invention, were it not for the high cost of the materials. The level of purity and degree of process control required result in the product costs associated with the second approach prohibit its widespread acceptance and use. Furthermore, the applications targeted for the present invention do not require the strict resistance to devitrification that is a specific goal of this second approach to the production of ceramic fiber shapes.

SUMMARY OF THE INVENTION

It has been discovered that a rigid fibrous insulating material which can be used at high temperatures, maintain its shape and strength after heat treatment, and is moderate in cost, can be produced from a composition consisting of ordinary ceramic fibers, low grade particulate silica materials, and boron nitride powder. This material is subjected to a sintering process after forming and drying, which is essential to the successful preparation of this product.

This thermally bonded product may be produced in a wide range of combinations of the three components mentioned above. Properties of the resulting shape are altered according to the combination of materials and sintering process executed. Improvements demonstrated over the prior art by this invetion are improved strength with a maintained low density as compared to the first type of fibrous products, and a greatly reduced cost in comparison to the high purity product described as the second type of refractory fiber product.

In the present invention, the fiber constitutes between 50 and 88 percent of the mixture by weight of total dry inorganic constituents. The particulate silica is in the range of between 10 and 43 percent of the mixture by weight. The boron nitride powder is in the range of between 2 and 20 percent by weight.

DETAILED DESCRIPTION OF THE PREFERRED EMBODIMENT

Figure 1:
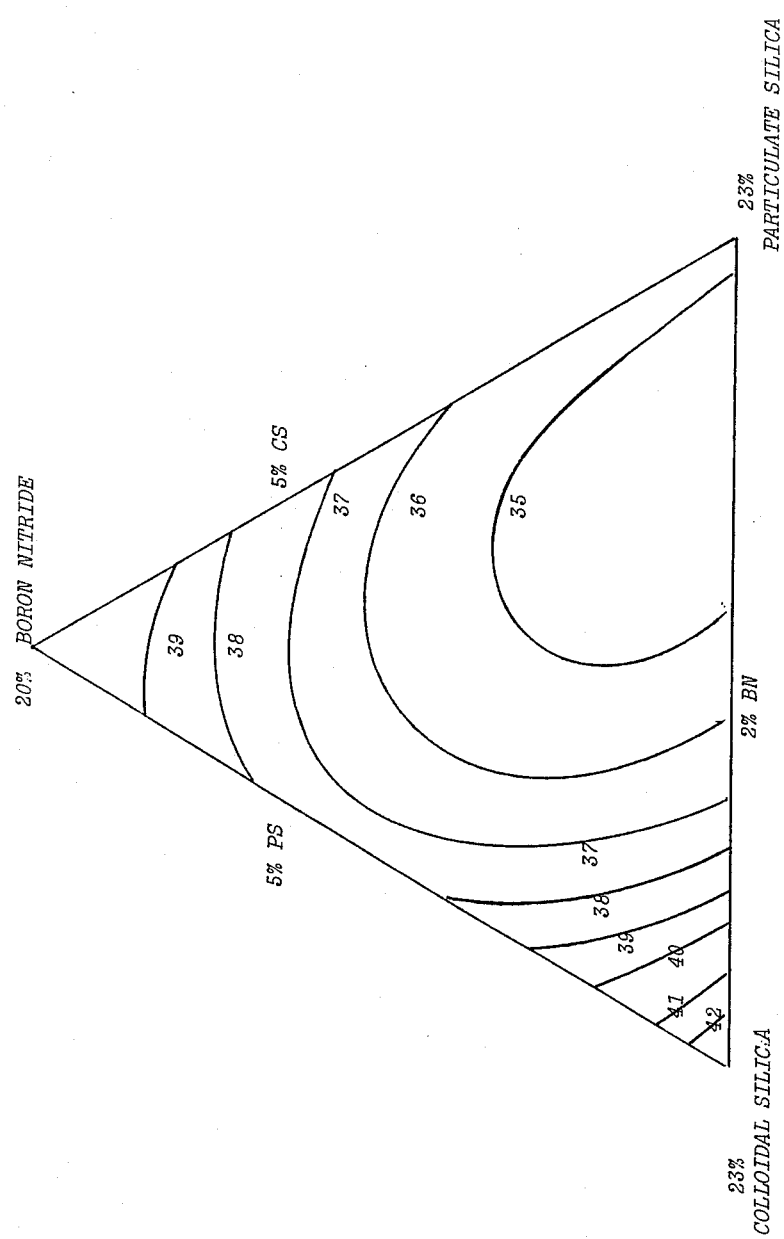
FIG. 1 is a contour plot of the fired density of pieces produced with 70% fiber by weight.

The invention comprises the construction or formation of thermally bonded fibrous products, comprising a sintered blend of primarily aluminosilicate fibers, silica powders and boron nitride powder, that are low in cost, and which have high-strength, low-density, high thermal insulating value and excellent machineability. Specifically, the products comprising the composition of this invention are particularly suited for use as diesel soot filters, kiln furniture, combustor liners and burner tubes.

The fibers used in this invention have principal components of about 35 to about 65 percent $SiO_2$ and about 35 to 65 percent $Al_2O_3$ by weight. The fibers may also include other oxides which equal to an amount less than about 10 percent by weight. This type of fiber is produced, but not exclusively, by The Babcock and Wilcox Company as Kaowool ® brand ceramic fiber. The average diameter of these fibers is about 3 microns. The crystal morphology of these fibers is unimportant to the successful production of this invention.

The particulates employed in the formation of the products of the invention include $-325$ mesh silica powder and smaller amounts of $-325$ mesh boron nitride powder. Suitable silica powders include high purity quartz silica powder ($-325$ mesh), as is available from Atlantic Equipment Engineers; high purity amorphous fumed silica (12 millimicron), marketed under the trademark AEROSIL 200μ by Degussa; $-325$ mesh silica particles, produced by Harbison-Walker; and colloidal silica, Ludox HS40, produced by DuPont. Any fine (less than 44 μm) powdered or colloidal silica would be suitable. High purity is not essential. Boron nitride powder, marketed as UCAR HCV by Union Carbide, has been found to provide a suitable boron nitride.

The following examples are illustrative and explanatory of portions of the invention and not restrictive thereof.

EXAMPLE 1

Aluminosilicate fiber, in an amount equivalent to 76.2% of the total dry solids, was added to a batch vessel containing deionized water. Silica powder, as available from Atlantic Equipment Engineers, was added to the batch in an amount equal to 19% of the total dry solids. Finally, boron nitride was added to the batch as 4.8% of total dry solids to complete the composition.

The solution was mixed with high shearing action for a time sufficient to disperse each component and form a homogeneous material. After dispersion, the batch was flocculated to form discrete agglomerates of the fiber/powder mixture.

Blocks of the material were formed by pouring the batch into a mold, allowing the mix to free drain, then pressing and simultaneously removing water through the top and bottom platen.

The pad was oven dried at approximately 250° F. (121° C.) until thoroughly dry. The dried parts were then fired in an electric furnace, at a heat-up rate of about 400° F./hr (205° C./hr) and held at the sintering temperature for 90 minutes. The aluminosilicate fiber-silica powder-boron nitride composition was then fired at 2350° F. (1287° C.). In Example II the aluminosilicate-fumed silica-boron nitride was fired at 2500° F. (1371° C.).

Room temperature modulus of rupture (MOR) and density were determined in the as-fired condition, and after reheats to 1800° F. (982° C.), 2100° F. (1148° C.) and 2400° F. (1316° C.). Table I reflects the values of these properties for sample billets formed from this first system.

EXAMPLE 2

A second batch was prepared in accordance with the method described above with the following changes to the ingredients. Aluminosilicate fiber in amounts equal to 9.5% of the total dry solids, amorphous fumed silica (Aerosil 200μ) in amounts equal to 7.5% of the total dry solids and boron nitride in an amount equal to 3.3% of the total dry solids, was added to the deionized water. The other processing was identical to that described above. Again, room temperature modulus of rupture (MOR) and density were determined in the as-fired condition and after reheats to 1800° F. (982° C.), 2100° F. (1148° C.) and 2400° F. (1316° C.). Table II contains the results obtained for this material.

EXAMPLE 3

A third experiment was completed utilizing the processing described above. In this instance, the composition consisted of (percentages given as percent of the total dry solids):

76% Aluminosilicate fiber (B & W Kaowool)
10% Fused Silica (Harbison-Walker GP-7-1)
10% Colloidal Silica (DuPont Ludox HS-40)
4% Boron Nitride (Union Carbide)

Again, room temperature modulus of rupture (MOR) and as-fired density were measured. The density of 30 lb./ft.$^3$ and Mor of 1000 lb./in$^2$ suggests that benefits were gained by using at least some colloidal silica in the composition.

EXAMPLE 4

(In this example, a series of compositions were produced in order to evaluate the compositional field consisting of aluminosilicate ceramic fiber, colloidal silica, particulate silica, and boron nitride.) The experiment was conducted with the following constraints (decimal values given are fractions of the total dry solids in the composition):

0.70 < Fiber < 0.88
0.05 < Colloidal Silica < 0.23
0.05 < Particulate Silica < 0.23
0.02 < Boron Nitride < 0.20

The batches were mixed and formed into billets according to the procedure described in Example 1. The as-fired billets were trimmed to yield square blocks for measurements. Density and MOR at room temperature were measured. The results are illustrated in FIGS. 1–6.

Referring to FIG. 1, it can be seen that moving toward either colloidal silica or boron nitride increases the density of the resulting part. The range of densities obtainable with 70% fiber and this processing is seen to be $34 < X < 43$ lb./ft.$^3$, where X is the density. It can also be seen that the change in density per unit change in composition increases as 23% colloidal silica is approached.

Figure 2:
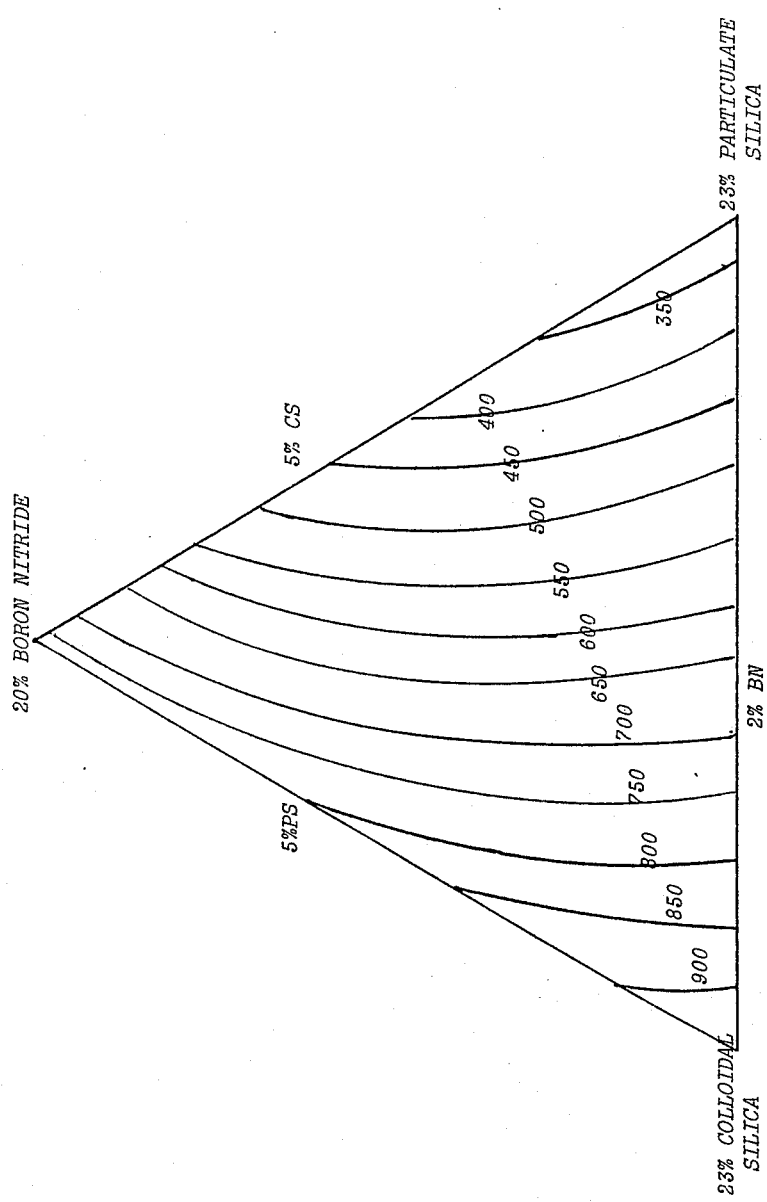
FIG. 2 is a contour plot of the modulus of rupture (MOR) of the resulting blocks in the compositional field with a constant 70% fiber.

From FIG. 2 it can be seen that the MOR increases with increasing amounts of colloidal silica. It is also seen that the amount of boron nitride affects the MOR only slighty. When FIGS. 1 and 2 are considered simultaneously, it can be seen that the MOR follows a general trend of increasing as density increases in the area of high colloidal silica. In the low density area, it is possible to significantly alter MOR without changing density by altering the composition. This points out the usefulness of colloidal silica to the composition.

Figure 3:
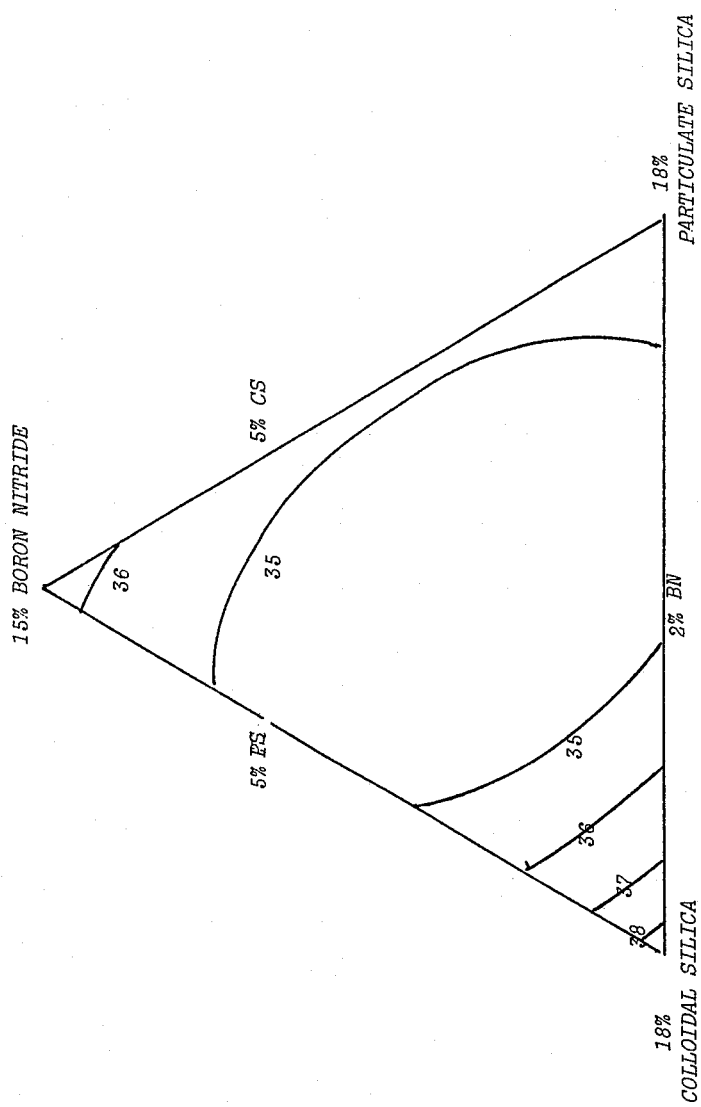
FIG. 3 is a response surface contour plot of density at a constant 75% fiber.
Figure 4:
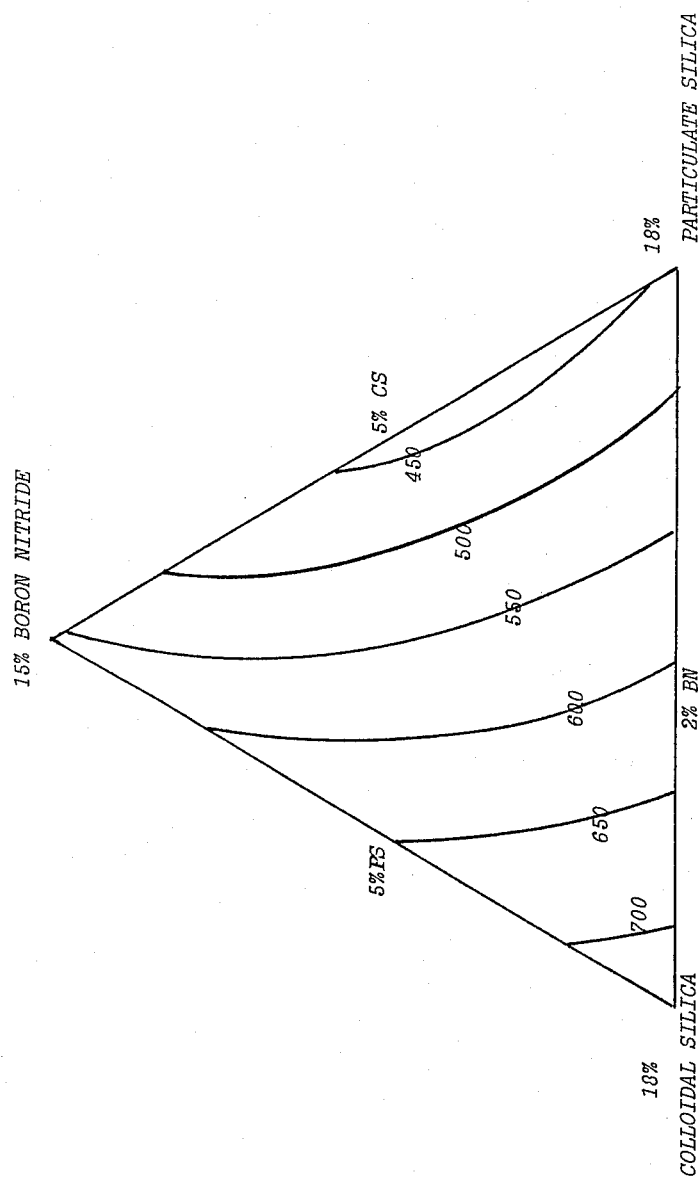
FIG. 4 is the corresponding MOR response surface at 75% fiber.

From FIG. 3 it is apparent that at the increased fiber content, the maximum density obtainable is lower than shown in FIG. 1. Also, the rate of change of the density as composition changes is less at the higher level of fiber. This is advantageous with regard to process sensitivity to changes.

The range of MOR is somewhat lower (400<X<750), where X is the MOR. It can be seen that, as in FIG. 2, the MOR increases as colloidal silica is increased.

Figure 5:
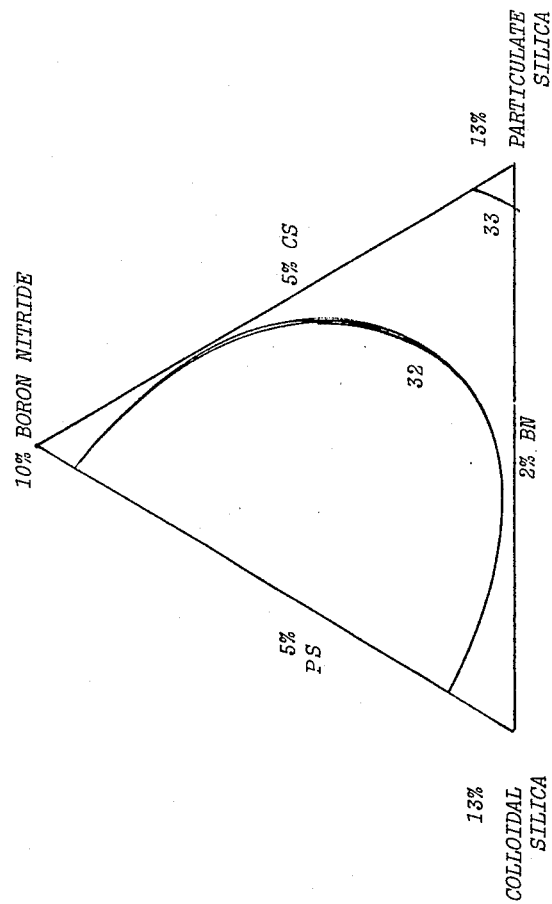
FIG. 5 is the density contour plot for the compositional field possible with 80% fiber included.

From FIG. 5, it is seen that the density does not vary much in the entire region.

Figure 6:
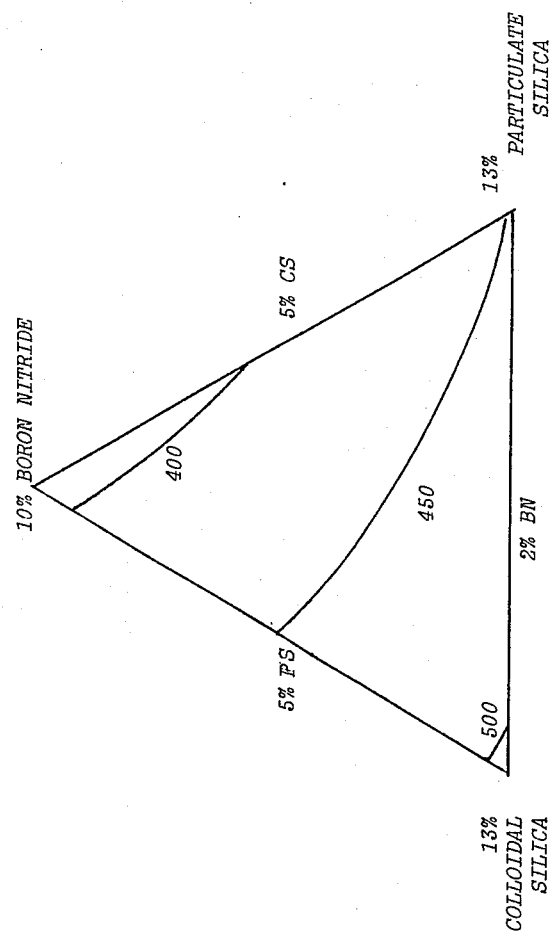
FIG. 6 is the corresponding MOR response surface at 80% fiber.

From FIG. 6, it is seen that the change in properties for 80% fiber indicates that "normal" variations in composition during processing would not lead to large changes in resulting product properties.

This Example 4 illustrates the potential of producing a useable product in a wide compositional range, namely, in which the aluminosilicate fiber is between 70 and 88 percent, colloidal silica is between 5 and 23 percent, fused silica is between 5 and 23 percent, and boron nitride is between 2 and 20 percent, with all percentages being given on a percent by weight basis of the total dry solids in the composition.

EXAMPLE 5

Another experiment was completed to better define the range of fiber contents in the present invention. The compositions prepared in this experiment are presented in Table III. It should be noted that the compositions differed mainly in percent fiber added. The boron nitride level was maintained at 4% of the total dry solids. The remainder was equally divided between colloidal silica and fused silica.

The processing of the mix and subsequently forming into the fired billet was conducted as set forth in Example 1. The billets were cut to square blocks for measurement of density. Samples for MOR were also prepared and measurements completed.

Figure 7:
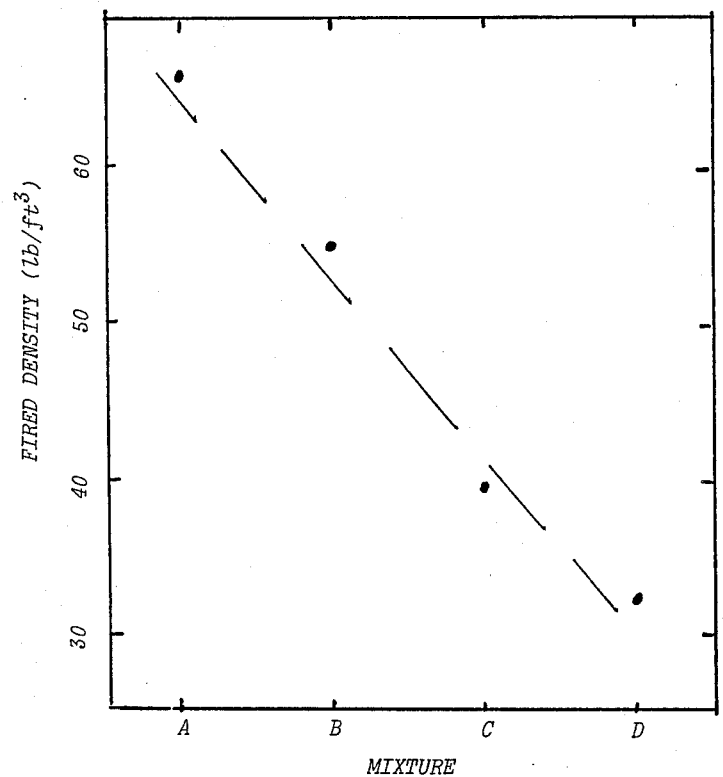
FIG. 7 shows the increase of density with decreasing amount of fiber.
Figure 8:
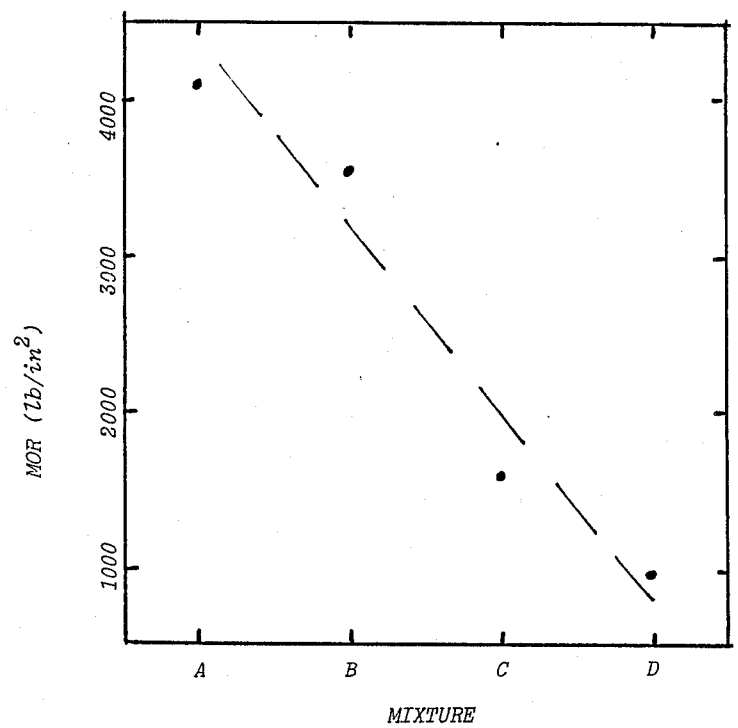
FIG. 8 shows the relationship between MOR and fiber content, and indicates that MOR increases as the fiber content is reduced.

The very high bending strengths (MOR) obtained even at the high densities, is clearly seen from FIGS. 7 and 8. These properties are novel and it is felt that unique applications may be approached with the higher density range of the present invention. It has been seen, therefore, that the useful range of the components which form the present disclosure are as follows:

50%—<—Fiber—<—88%
10%—<—total particulate Silica—<—43%
2%—<—Boron Nitride—<—20%.

Also, it is preferable, but not essential, that some portion of the particulate silicate is added in the form of colloidal silica.

TABLE I

| | −325 Mesh Silica Powder | | | |
|---|---|---|---|---|
| | | Reheat | | |
| | As Fired | After 8 hr @ 1800° F. (982° C.) | After 48 hr @ 2100° F. (1149° C.) | After 8 hr @ 2400° F. (1316° C.) |
| MOR, psi (kg/cm$^{-2}$) | 860 (60.4) | 805 (56.6) | 820 (57.6) | 1025 (72.0) |
| Density pcf (kg/m$^3$) | 31 (496.6) (496.6) | 31 (464.6) | 29 (496.6) | 31 |
| MOR/Density (Psi/Pcf) | 28 | 26 | 28 | 33 |
| Firing Temp. °F. | 2650 | 2650 | 2350 | 2350 |
| (°C.) | (1454) | (1454) | (1288) | (1288) |

TABLE II

| | Fumed Silica Powder | | |
|---|---|---|---|
| | | Reheat | |
| | As Fired | After 48 hr. @ 2100° F. (1149° C.) | After 8 hr @ 2400° F. (1316° C.) |
| MOR, psi (kg/cm$^2$) | 380 (26.7) | 430 (30.2) | 460 (32.3) |
| Density pcf (kg/m$^3$) | 25 (464.6) | 27 (432.5) | 27 (432.5) |
| MOR/Density (Psi/Pcf) | 15 | 16 | 17 |
| Firing Temp. °F. (°C.) | 2500 (1371) | 2500 (1371) | 2500 (1371) |

TABLE III

| | COMPOSITIONS PRODUCED IN EXAMPLE 5 | | | |
|---|---|---|---|---|
| | MIX | | | |
| INGREDIENT | A | B | C | D |
| Fiber | .50 | .60 | .70 | .80 |
| Colloidal SiO$_2$ | .23 | .18 | .13 | .08 |
| Particulate SiO$_2$ | .23 | .18 | .13 | .08 |
| Boron Nitride | .04 | .04 | .04 | .04 |

Certain modifications and improvements will become obvious to those skilled in the art upon consideration of the foregoing material. These have been deleted herein for the sake of conciseness and readability but are intended to be within the scope of the following claims.

We claim:
1. A thermally bonded fibrous product comprising a blend of ceramic fibers, low-grade particulate silica, and powdered boron nitride formed by sintering.
2. A thermally bonded fibrous product as set forth in claim 1 wherein said ceramic fibers have a diameter of approximately 3 microns.
3. A thermally bonded fibrous product as set forth in claim 1 wherein said low-grade silica comprises a mixture of colloidal SiO$_2$ and particulate SiO$_2$.
4. A thermally bonded fibrous product as set forth in claim 3 wherein said blend includes colloidal SiO in the range of 8% to 23% by weight.
5. A thermally bonded fibrous product as set forth in claim 4 wherein said blend includes particulate SiO$_2$ in the range of 8% to 23% by weight.
6. A thermally bonded fibrous product as set forth in claim 5 wherein said blend includes ceramic fibers in the range of 50% to 80% by weight.
7. A thermally bonded fibrous product as set forth in claim 6 wherein said blend includes 4% boron nitride by weight.
8. A thermally bonded fibrous product as set forth in claim 1 wherein the blend of particulate silica is in the range of 10% to 43% by weight.
9. A thermally bonded fibrous product as set forth in claim 8 wherein the blend of ceramic fiber is in the range of 50% to 88% by weight.
10. A thermally bonded fibrous product as set forth in claim 9 wherein the blend of boron nitride is in the range of 2% to 20% by weight.
11. A thermally bonded fibrous product as set forth in claim 1 wherein said ceramic fiber is an aluminosilicate fiber.

* * * * *